(12) United States Patent
Lansford

(10) Patent No.: US 8,116,402 B1
(45) Date of Patent: Feb. 14, 2012

(54) METHOD AND SYSTEM FOR COGNITIVE RADIO

(75) Inventor: James L. Lansford, Austin, TX (US)

(73) Assignee: Alereon, Inc., Austin, TX (US)

(*) Notice: Subject to any disclaimer, the term of this patent is extended or adjusted under 35 U.S.C. 154(b) by 831 days.

(21) Appl. No.: 11/717,826

(22) Filed: Mar. 14, 2007

Related U.S. Application Data

(60) Provisional application No. 60/782,646, filed on Mar. 15, 2006.

(51) Int. Cl.
*H04L 27/00* (2006.01)
(52) U.S. Cl. ........ 375/295; 375/260; 375/267; 375/296; 375/299; 375/342; 370/206; 370/210
(58) Field of Classification Search .................. 375/250, 375/259, 260, 290, 292, 295, 297, 299, 302, 375/306, 316, 323, 342, 343, 345, 350, 346, 375/348, 296
See application file for complete search history.

(56) References Cited

U.S. PATENT DOCUMENTS

| | | | | |
|---|---|---|---|---|
| 7,720,163 B2 * | 5/2010 | Kirsch et al. | ................... | 375/260 |
| 7,809,069 B1 * | 10/2010 | Chiang et al. | ................. | 375/260 |
| 2003/0194979 A1 * | 10/2003 | Richards et al. | ............... | 455/216 |
| 2004/0047285 A1 * | 3/2004 | Foerster et al. | ................ | 370/210 |
| 2005/0105594 A1 * | 5/2005 | Giannakis et al. | ............ | 375/132 |
| 2006/0078038 A1 * | 4/2006 | McCorkle | ....................... | 375/130 |
| 2007/0133387 A1 * | 6/2007 | Arslan et al. | ................... | 370/206 |
| 2007/0213084 A1 * | 9/2007 | Birru et al. | ..................... | 455/501 |
| 2008/0007445 A1 * | 1/2008 | Leach et al. | .................... | 342/21 |
| 2009/0003418 A1 * | 1/2009 | Karabinis | ..................... | 375/219 |

* cited by examiner

*Primary Examiner* — Shuwang Liu
*Assistant Examiner* — Hirdepal Singh
(74) *Attorney, Agent, or Firm* — Sprinkle IP Law Group

(57) ABSTRACT

Systems and methods for cognitive radio are disclosed herein. Specifically, embodiments of the present invention may provide systems, methods and apparatuses for a cognitive radio which is operable to tailor its operation based on one or more criteria, which may pertain to the operating environment of the radio. In one embodiment, a cognitive radio may be operable to determine criteria associated with potentially interfering signals in the operating environment and determine corresponding transmission properties corresponding to protocol, power level, frequency, coding or timing of transmissions, so that these potentially interfering signals may be avoided or otherwise accounted for by transmitting according to these transmission properties.

26 Claims, 5 Drawing Sheets

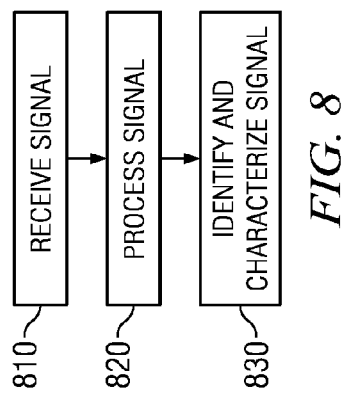
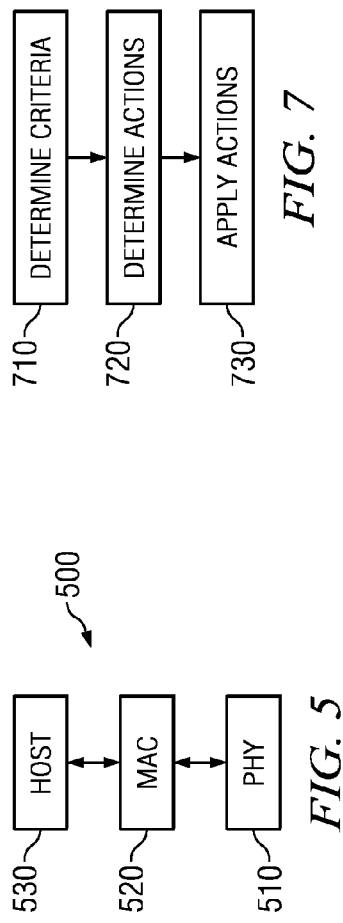
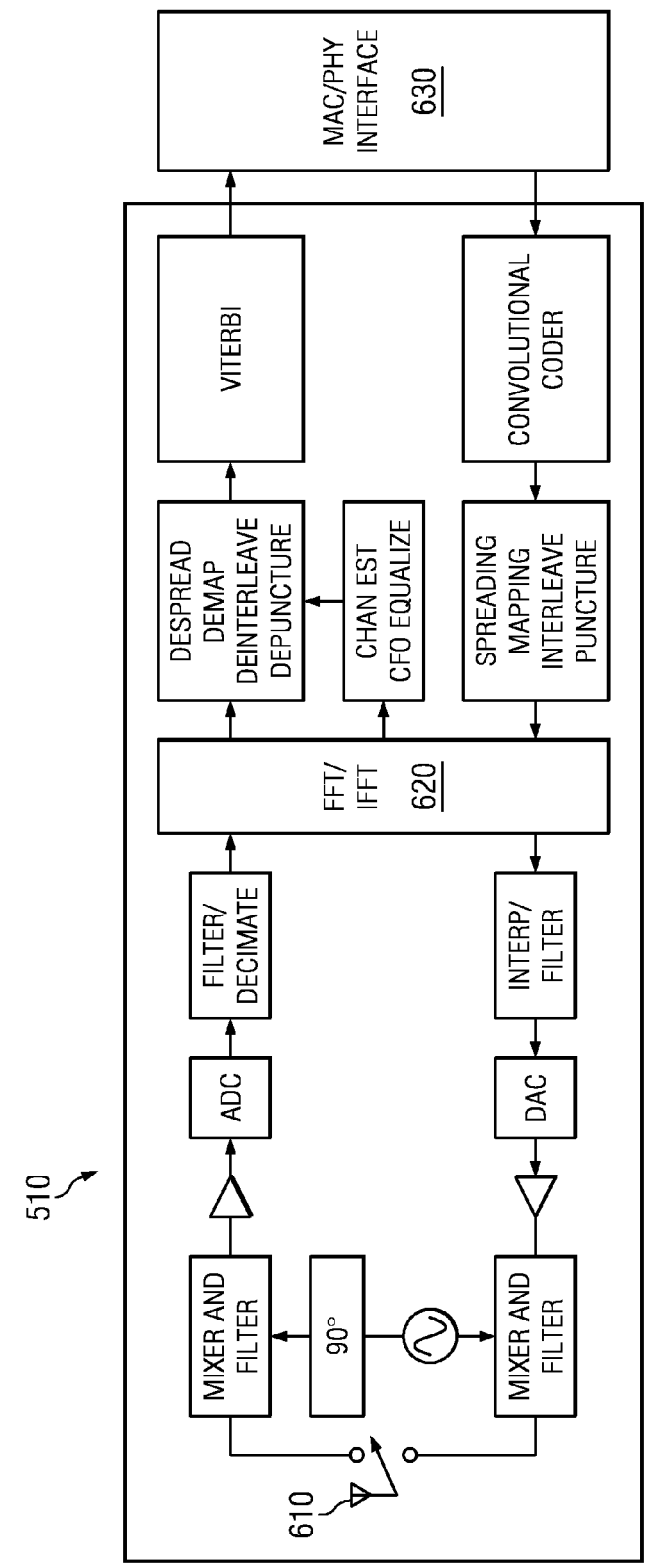

METHOD AND SYSTEM FOR COGNITIVE RADIO

RELATED APPLICATIONS

This application claims a benefit of priority to the filing date of U.S. Provisional Patent Application Ser. No. 60/782,646 by inventor James L. Lansford, entitled "Method and System for Cognitive Radio" filed on Mar. 15, 2006, the entire contents of which are hereby expressly incorporated by reference for all purposes.

TECHNICAL FIELD OF THE INVENTION

The invention relates in general to methods and systems for radios, and in particular to the design and implementation of radios operable to determine and avoid portions of the radio spectrum that have impairments such as potentially interfering signals. Even more particularly, embodiments of the present invention relate to systems and methods for ultrawideband (UWB) radios operable to determine the spectral impairments and adjust transmission properties of the radio to substantially optimize overall system performance in the radio environment.

BACKGROUND OF THE INVENTION

Recently, wireless data, entertainment and mobile communications technologies have become increasingly prevalent, particularly in the household environment. The convergence of these wireless data, entertainment and mobile communications within the home and elsewhere has created the need for merging many disparate devices into a single wireless network architecture capable of seamlessly supporting and integrating the requirements of all of these devices. Seamless connectivity and rapid transfer of data, without confusing cables and wires for various interfaces that will not and cannot talk to each other, is a compelling proposition for a broad market.

To that end, communication industry consortia such as the MultiBand Orthogonal Frequency Division Multiplexing (OFDM) Alliance (MBOA), the Digital Living Network Alliance (DLNA), the WiMedia Alliance and the like, are establishing design guidelines and standards to ensure interoperability of these wireless devices. For example, Wireless 1394, Wireless USB, and native IP-based applications are currently under development based on ultrawideband (UWB) radio or WiMedia Convergence Platform.

Although it began as a military application dating from the 1960s, UWB has recently been utilized as a high data rate (480+Mbps), short-range (up to 20 meters) technology that is well suited to emerging applications in the consumer electronics, personal computing and mobile markets. When compared to other existing and nascent technologies capable wireless connectivity, the performance benefits of UWB are compelling. For example, transferring a 1 Gbyte file full of vacation pictures from a digital camera to a computer take merely seconds with UWB compared to hours using other currently available, technologies (i.e. Bluetooth) and consume far less battery power in doing so.

UWB has also generated some concerns, however. In particular since UWB signals are spread over a broad swath of spectrum there has been concern that UWB will degrade the performance of other users of the spectrum encompassed by the UWB radio. Typically, devices which employ UWB utilize a fixed channel bandwidth that is static in frequency, or a fixed channel bandwidth that can be frequency agile. In either case, the bandwidth utilized by a device may remain substantially fixed. Thus, the range and data rate of the device is, for the most part, determined by the modulation/coding of the signal, and the power with which the signal is transmitted.

In most cases as UWB, by definition, is spread over a broad spectral range, the power spectral density of a signal utilized by a UWB device is usually very low, and hence, usually results in low incidence of interference with other systems which may be utilizing the same bandwidth as the UWB device or system. Power spectral density, however, is a function of distance. Consequently, if a UWB device was in close proximity to another wireless system there may be the potential for interference between the UWB device and the wireless system.

Consequently, there may be one or more frequency ranges within a UWB frequency spectrum where it is important to suppress interference. It may be desired to suppress interference within these frequency ranges for a variety of reasons. One of these reasons is the existence of existence of other devices which utilize at least a portion of the frequency ranges. As noted above, UWB encompasses a broad frequency range, thus the opportunity for interference between UWB devices and the myriad number of other device which either currently use portions of the UWB frequency spectrum or which are being designed to utilize a portion of this frequency spectrum (e.g. Broadband Fixed Wireless Access Systems such as IEEE 802.16e or WiMax, Bluetooth systems, etc.) may exist.

Additionally, certain regulatory environments may dictate that a device not emit within certain frequency ranges (or that emissions in the frequency ranges are below a certain level). For example, some existing UWB spectrum allocations encompasses the frequency range utilized by the C-Band satellite downlinks. Thus, there is a potential for UWB systems to interfere with the reception of those types of system and certain regulatory entities or governing bodies have dictated that devices may not emit in the spectrum allocated for C-Band satellite.

As can be seen then, being able to control the transmission properties of a UWB (or other type of radio) signal is important for a myriad number of reasons, including regulatory decrees, commercial feasibility and interference issues. One approach to deal with these types of issues is to apply a spectral mask to a UWB signal prior to its transmission. Utilizing a spectral mask interference or overlap between the frequencies of a transmitted UWB signal and the frequencies utilized by other systems may be minimized.

While this approach may be useful for certain regulatory environments it is an overly draconian approach as it requires a UWB device to avoid emissions in a given frequency range, even if the frequency range is not currently in use by any other device within the range of the UWB device. Consequently, the performance of the UWB device may be degraded for no reason. Furthermore, if other systems or devices begin to emit in the frequency spectrum which is being utilized by the UWB device, the UWB device does not have the ability to detect and mitigate this interference, as the frequency range in which the UWB radio suppresses emissions is substantially fixed by the spectral mask.

Thus, there is a need for systems, apparatuses and methods for radios which are capable of determining potential interference within a frequency spectrum and dynamically adjusting the transmission properties of the radio accordingly.

SUMMARY OF THE INVENTION

Systems and methods for cognitive radios which are operable to determine potentially interference such as spectral impairments and adjust transmission properties of the radio accordingly are disclosed herein. Specifically, embodiments of the present invention may provide systems, methods and apparatuses for a cognitive radio which is operable to tailor its operation based on one or more criteria, which may pertain to the operating environment of the radio. In one embodiment, a cognitive radio may be operable to determine criteria associated with potentially interfering signals in the operating environment and determine corresponding transmission properties corresponding to protocol, power level, frequency, coding or timing of transmissions, so that these potentially interfering signals may be avoided or otherwise accounted for by transmitting according to these transmission properties.

Thus, in one embodiment, criteria associated with an operating environment of an ultrawideband (UWB) transceiver are determined and a set of actions are determined based on the criteria. The set of actions comprise a set of transmission properties such that transmitted signals signal adhere to the transmission properties.

Embodiments of the present invention may provide the technical advantages of substantially reducing the interference between different devices utilizing the same frequency spectrum (or portions thereof), such that performance of the respective devices may be substantially optimized or improved with respect to one another. In other words, the throughput may be improved, latency or error rate reduced, etc. by altering the transmission properties of one or more devices sharing portions of the same frequency spectrum to account for these other consumers of the frequency spectrum. In some case, contention for the frequency spectrum may be avoided altogether by the collaborative coexistence of these different devices.

Embodiments of the invention disclosed herein can be implemented by programming one or more computer systems or devices with computer-executable instructions embodied in a computer-readable medium. When executed by a processor, these instructions operate to cause these computer systems and devices to perform one or more functions particular to embodiments of the invention disclosed herein (e.g., generate an appropriate confidence level or score for each event.) Programming techniques, computer languages, devices, and computer-readable media necessary to accomplish this are known in the art and thus will not be further described herein.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

FIG. 5 is a block diagram of one embodiment of a radio architecture;

FIG. 6 is a block diagram of one embodiment of a physical layer;

FIG. 7 is a flow diagram of one embodiment of a method for a cognitive radio;

FIG. 8 is a flow diagram of one embodiment of a method for determining characteristics of a signal.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements). Before discussing specific embodiments of the present invention, exemplary frequency ranges and sub-bands for use in describing the present invention will be presented. Though embodiments of the systems and methods of the present invention may be described with reference to these frequencies, sub-band or UWB radios it will be understood the embodiments of the systems and methods of the present invention may apply to almost any radio device which emits in almost any frequency spectrum according to almost any protocol, coding, timing, etc. Furthermore, while potentially interfering signals may be described herein as comprising frequency ranges specified by regulatory environments or detected signals within a utilized frequency spectrum, it will be understood that the term may be applied generally to any signal which it is desired to avoid interfering with or any frequency range in which it is desired to avoid transmission.

Figure 1:
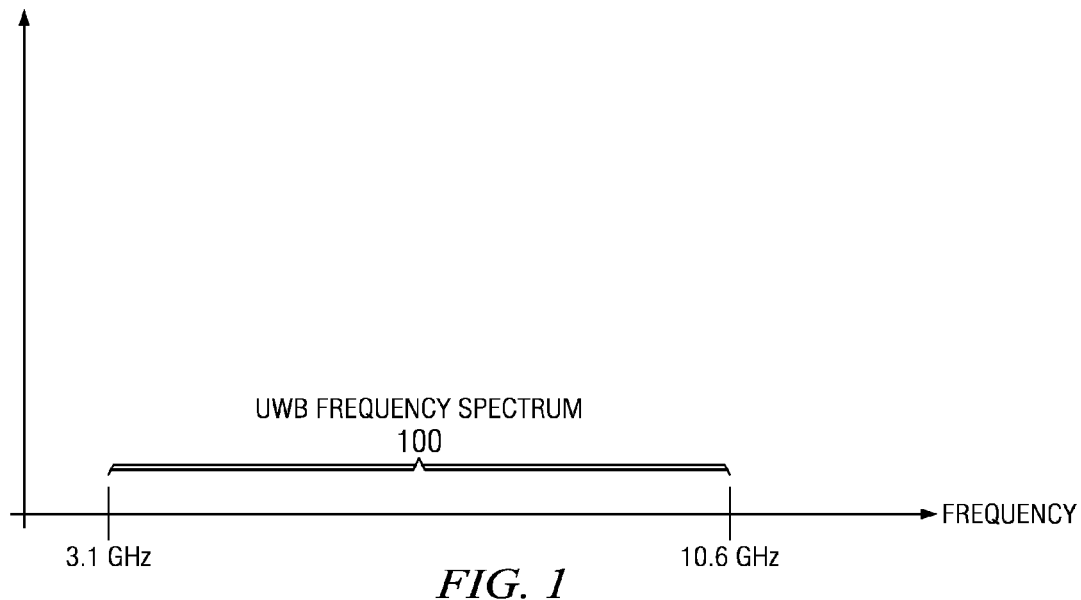
FIG. 1 is an illustration of one embodiment of a UWB frequency spectrum.

Turning to FIG. 1, one embodiment of a frequency spectrum is illustrated. Frequency spectrum 100 encompasses the radio spectrum from 3.1 GHz to 10.6 GHz, and has been allocated by the FCC to "ultrawideband" technology. The term "ultrawideband" was first coined by the U.S. Department of Defense in 1989, and early applications leveraged the technology's properties as ground-penetrating radar.

Today, the definition for ultrawideband (UWB), according to the FCC, is any radio technology with a spectrum that occupies greater than 20 percent of the center frequency of a minimum of 500 MHz. Recognizing the advantages of new products that could incorporate this technology to benefit public safety, enterprise and consumer applications, in 2002 the FCC allocated radio spectrum 100 from 3.1 GHz to 10.6 GHz expressly for these purposes. Additionally, spectrum 100 is also available for use by medical, scientific, law enforcement, and fire and rescue organizations.

Rather than requiring a UWB radio to use this entire 7.5 GHz band to transmit information, or even a substantive portion of it, the FCC defined a specific minimum bandwidth of 500 MHz to a −10 dB level. This minimum bandwidth (in conjunction with other requirements of the FCC ruling) substantially protects incumbent users of the spectrum. The flexibility provided by the FCC ruling greatly expands the design options for UWB communication systems. Designers are free to use a combination of sub-bands within the spectrum to optimize system performance or power consumption, minimize design complexity or mitigate interference. UWB systems can still maintain the same low transmit power as if they were using the entire bandwidth by interleaving symbols across these sub-bands.

Figure 2:
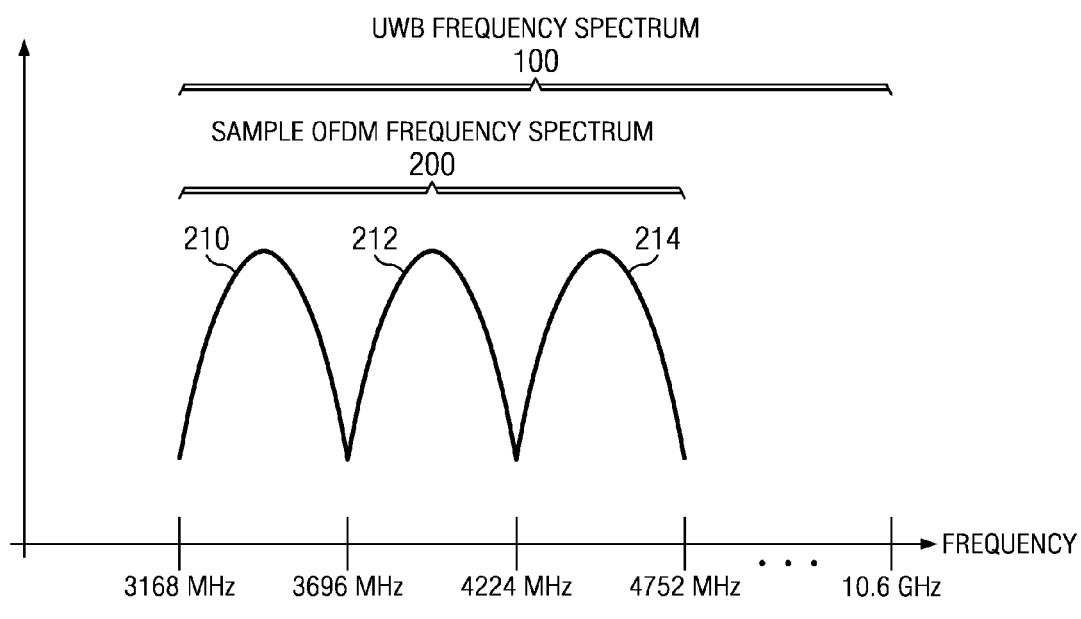
FIG. 2 is an illustration of one embodiment of sub-bands of a frequency spectrum.

Moving on to FIG. 2, one embodiment of a frequency spectrum and sub-bands of this frequency spectrum suitable for use with Orthogonal Frequency Division Multiplexing (OFDM) is illustrated (it will be apparent the OFDM may utilize other sub-bands within frequency spectrum 100, or another frequency spectrum, as well). Frequency spectrum 200 from 3.1 GHz to 4.8 GHz is sufficient for three sub-bands 210, 212, 214 of 500 MHz or greater, as provided for by the FCC. In this case, each of sub-bands 210, 212, 214 encompasses 528 MHz of frequency spectrum 200, with the frequencies occupied by each sub-band 210, 212, 214 being substantially orthogonal to the other two sub-bands 210, 212, 214.

Figure 3:
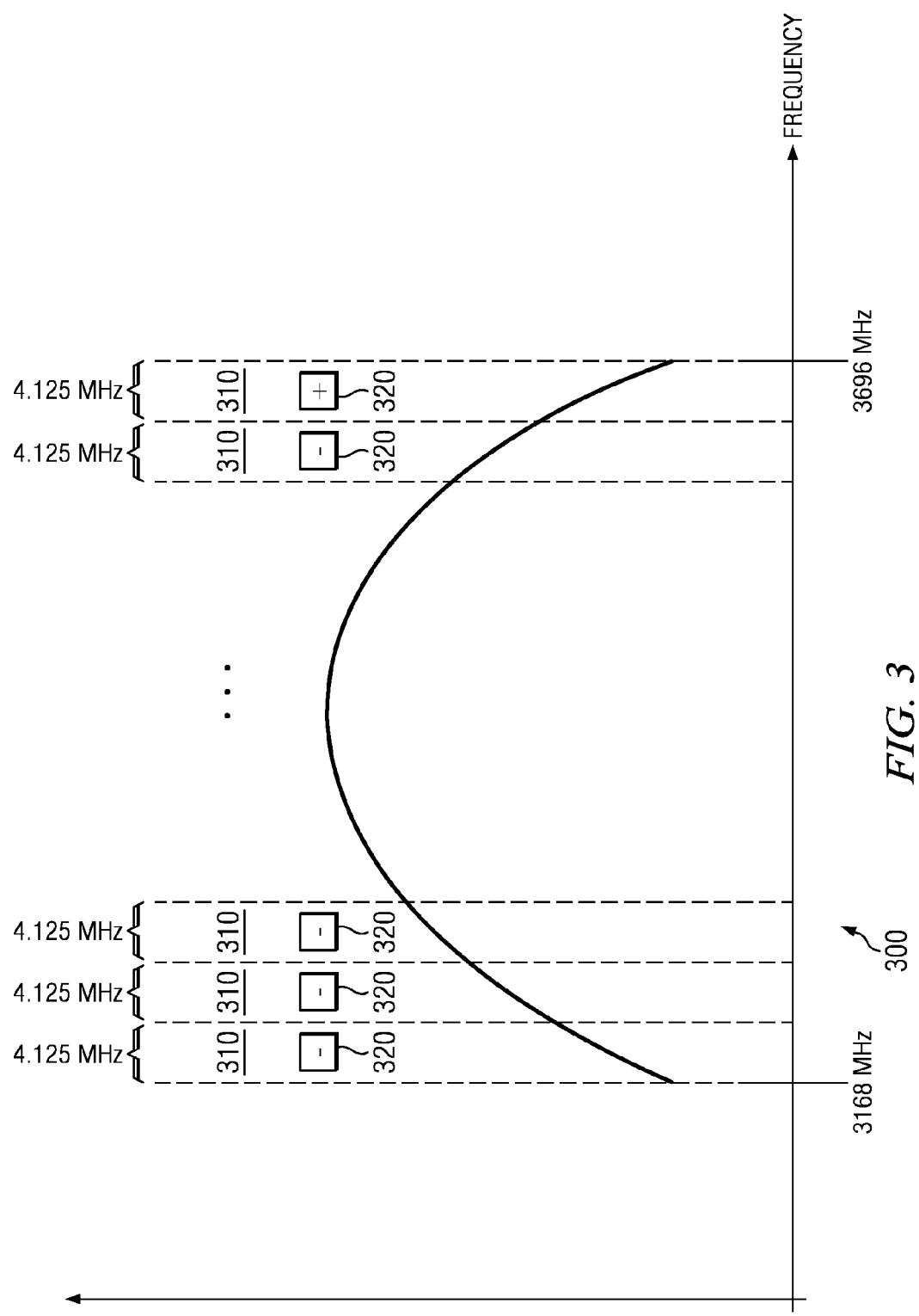
FIG. 3 is an illustration of one embodiment of tones associated with a frequency range.

When employing certain embodiments of OFDM, frequency spectrum 200 may be further divided into a number of tones. FIG. 3 illustrates one embodiment of the division of a frequency spectrum into a number of tones. Frequency spectrum 300 represents the portion of frequency spectrum 200 encompassed by sub-band 210. Sub-band 210 may be divided into a number of substantially orthogonal tones 310, each tone 310 encompassing 4.125 MHz of the frequency spectrum. Thus, sub-band 210, which encompasses 528 MHz of frequency spectrum 200, may be divided into 128 tones 310, each encompassing 4.125 MHz. A device employing OFDM may modulate data 320 onto tones 310 which may then be received on tones 310 and demodulated by another device employing OFDM. The information may be modulated onto a tone by adjusting the tone's phase, amplitude, both amplitude and phase or by another method.

Figure 4:
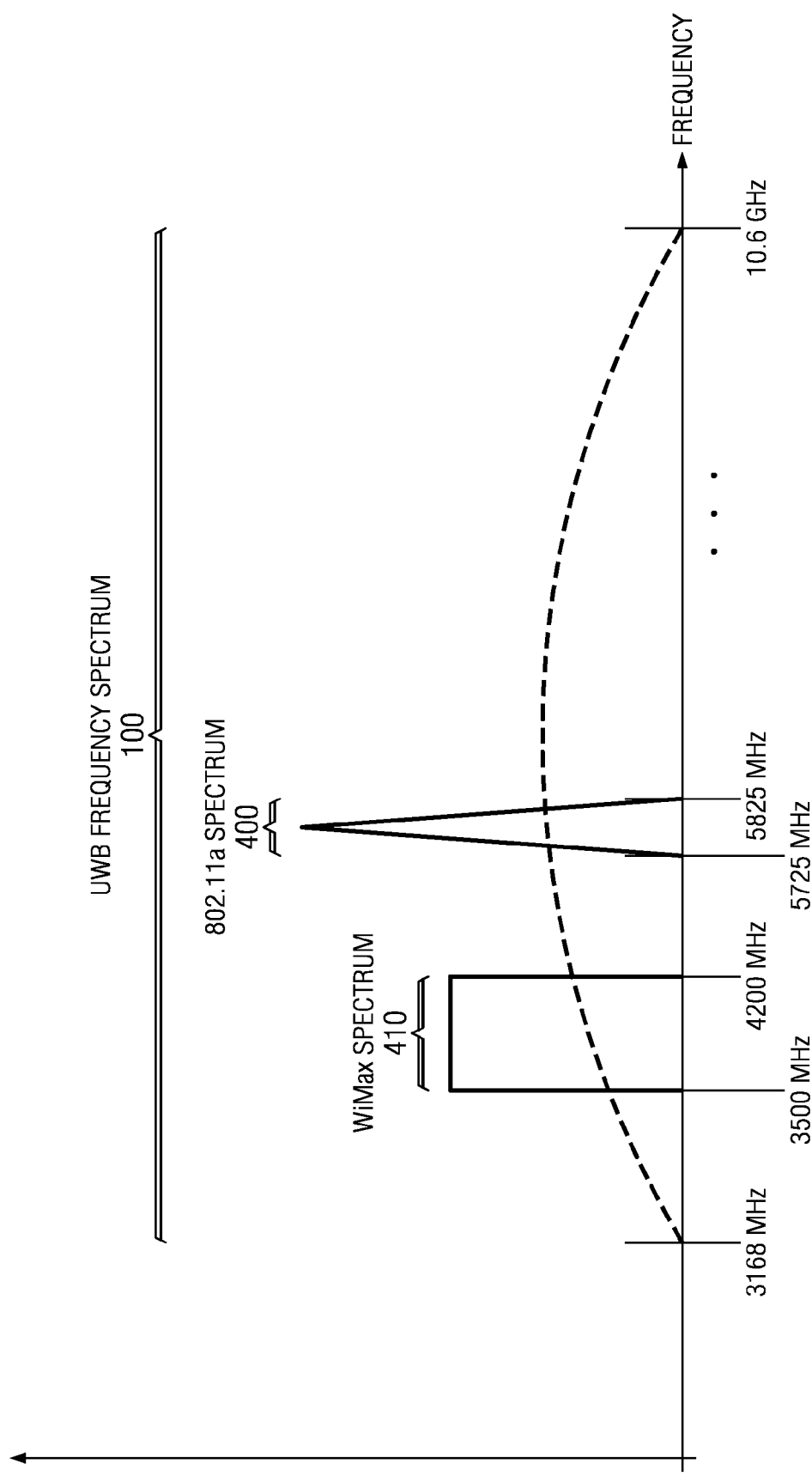
FIG. 4 is an illustration of one embodiment of various frequency ranges.

It will be apparent that a variety of UWB devices and systems may utilize spectrum 100, however. This may be problematic, as other standards have evolved which also call for the utilization of portions of frequency spectrum 100. Turning to FIG. 4, other frequency spectrums (i.e. frequency ranges) which are utilized by other technologies and overlap with frequency spectrum 100 are depicted. In addition, channel impairments such as shadowing, noise, or fading may cause portions of the radio spectrum to be unusable.

Frequency spectrum 400 depicts one example of a frequency spectrum for use with IEEE 802.11a compliant devices. The IEEE 802.11a amendment to the original IEEE 802.11 standard was ratified in 1999. The IEEE 802.11a standard uses the same core protocol as the original IEEE 802.11 standard, usually operates in the GHz band, and usually utilizes 52-subcarrier orthogonal frequency-division multiplexing.

Frequency spectrum 410 depicts one example of a frequency spectrum for use with embodiments of WiMAX compliant devices according to the IEEE 802.16 standard, and example of which could be the region of the radio spectrum around 3.5 GHz. The original WiMAX standard, IEEE 802.16, specifies WiMAX in the 10 to 66 GHz range. However, newer standards have specified frequency spectrum 410 as the operating range for embodiments of WiMAX devices.

As can be seen, there is a certain amount of overlap between frequency spectrums 100, 400 and 410. Thus, there may be a desire to reduce interference between devices utilizing frequency spectrums 100, 400 or 410. In some cases, non-interference may be mandated by regulatory agencies or standard setting bodies. For example, it may be mandated by a regulatory agency that if a UWB device utilizes frequency spectrum 100, this device may not emit within a certain frequency range, or must emit below a certain power level in this frequency range. It may also be mandated that a UWB device utilizing frequency spectrum 100 cede certain frequency ranges within frequency spectrum 100 if other transmissions are detected in those ranges. For example, a UWB may be required to stop emitting in frequency range 410 if it detects another device broadcasting in frequency spectrum 410, as it may be intended to reserve spectrum 410 solely for WiMax devices or other services. Consequently, it is desirable to have methods, systems and apparatuses to avoid interference in a radio where these methods and systems may be implemented based upon one or more policies, the implementation of policies, in turn depending on a variety of criteria including a detection of a potentially interfering signal where the potentially interfering signal may be a signal which may currently be present in the frequency spectrum (e.g. a detected signal) or which may be imposed, defined, may become present at some future time, etc. (e.g. presence within a regulatory environment or otherwise dictated).

Before delving into specific embodiments of the systems and methods of the present invention it may be useful to present an example cognitive radio architecture which may be useful in explaining various embodiments of these systems and methods. Moving to FIG. 5, one embodiment of an architecture of a cognitive radio is presented. Cognitive radio 500 may comprise a UWB transceiver adhering to the standards promulgated by the WiMedia/MBOA alliance, the UWB Forum, etc. Thus, in one embodiment, radio 500 may comprise a physical layer (PHY) 510, a Media Access Controller (MAC) layer 520 and a host layer 530 which may comprise one or more protocol adaptation layers or associated protocol implementations. Host layer 530 may communicate with MAC layer 520 via one or more application programming interfaces while PHY 510 may communicate with MAC 520 via one or more interfaces which may, for example, include interfaces implementing the WiMedia/MBOA interface specification.

A more detailed representation of one embodiment of PHY 510 is depicted in FIG. 6. While almost any embodiment of a PHY may be used in conjunction with embodiments of the present invention, in order to better describe specific embodiments of the present invention PHY 510 may be operable to implement Multi-Band OFDM (MB-OFDM) as specified by the WiMedia/MBOA alliance. Thus, PHY 510 may receive signals on antenna 610, transform these signals and make the transformed signals or portions thereof, available through MAC/PHY interface 630. Particularly, signals received at antenna 610 may be transformed by Fast Fourier Transform/Inverse Fast Fourier Transform Logic 620 before being made available to MAC/PHY interface 630. For example, what may be made available to MAC/PHY interface 630 is a transformed signal corresponding to energy associated with 128 tones in a sub-band (as discussed above), energy corresponding to tones in multiple sub-bands or energy corresponding to tones across an entire frequency spectrum which may be utilized by radio 500 (e.g. frequency spectrum 100).

MAC 520 may, in one embodiment, amalgamate or otherwise combine or manipulate transformed signals made available to it via PHY 510 to form other transformed signals corresponding to one or more frequency range(s) (e.g. sub-bands or the like) within frequency spectrum 100 or the entire frequency spectrum 100. For example, MAC 520 may average a number of transformed signals from PHY 510 to determine an average over a period of time. For example, MAC 520 may average 16 energy spectrums corresponding to a frequency range each provided at a different time from PHY 510 to obtain an average energy spectrum over a particular time period. Any signals processed by MAC may be made available to host 530 through an interface (as discussed above).

With the above discussions in mind, attention is now directed to apparatuses, systems and methods for cognitive radio. Specifically, embodiments of the present invention may provide systems, methods and apparatuses for a cognitive radio which is operable to tailor its operation based on one or more criteria, which may pertain to the operating environment (physical, regulatory or otherwise) of the radio. In one embodiment, a cognitive radio may be operable to determine criteria associated with potentially interfering signals in the operating environment and determine corresponding transmission properties such as protocol, power level, frequency, coding or timing accordingly, so that these potentially interfering signals may be avoided or otherwise accounted for by transmitting according to these transmission properties. Additionally, the criteria may include data corresponding to a regulatory environment in which the cognitive radio may be operating such that transmission properties can also be determined according to this regulatory environment.

Not only does the ability of a cognitive radio to alter the properties of its transmissions reduce the interference between two competing consumers of the spectrum, but additionally will serve to increase the performance of the cognitive radio by reducing transmissions of the cognitive radio in crowded portions of the frequency spectrum which, in turn, may increase the data rate of transmissions and drop the error rate, resulting in an overall improvement in the quality of service provided by the cognitive radio.

Turning now to FIG. 7, one embodiment of a method for the implementation of cognitive radio is depicted. At step 710, one or more criteria corresponding to the operating environment of the radio are determined. Utilizing these criteria then, a set of actions may be determined at step 720, where these actions include a set of transmission properties, and these actions applied with respect to the cognitive radio at step 730. It will be noted that the method described with respect to FIG. 7 may be applied substantially continuously during the operation of a cognitive radio such that the criteria may be dynamically updated and the cognitive radio dynamically adjusted (e.g. through the application of any determined actions) during operation of the cognitive radio.

The criteria determined at step 710 may comprise data pertinent to a regulatory environment of the cognitive radio, including geographic data pertaining to the location of the cognitive radio, which may for example be obtained from a global positioning system (GPS) device associated with the cognitive radio, from an associated communication network (e.g. a cellular phone tower or the like), a stored setting configured by a user of the cognitive radio or another source. Criteria may also be obtained from the configuration of associated devices. For example, if a cognitive radio is being utilized in a computing device (e.g. a laptop computer) a configuration or other type of file or setting (e.g. a hardware configuration file) of the computing device may be analyzed to determine if any other devices which may produce a signal which could cause interference with the cognitive radio are installed or operating.

These criteria may also include characteristics of potentially interfering signals detected in the operating environment of the cognitive radio. Turning briefly to FIG. 8, one embodiment of a method for determining characteristics of signals detected in the operating environment of a cognitive radio are depicted. A signal corresponding to the environment may be received at step 810 and this signal processed at step 820 such that the criteria associated with the signal, including characteristics of the signal, may be determined at step 830.

More specifically, a signal may be received at antenna 610 at step 810. Note that this signal may or may not correspond to a signal transmitted by another device and may be a signal corresponding to an environmental survey. In other words, the current energy in a particular frequency range (e.g. one or more sub-bands or an entire frequency spectrum operable to be utilized by a cognitive radio) at a given instant of time may be detected at antenna 610 and processed by FFT/IFFT logic 620 or other logic (such as analog filters, etc.) to produce a transformed signal (e.g. which may comprise spectral data) corresponding to the received signal. This transformed signal may, for example, comprise energy detected in each of a set of tones corresponding to a frequency range or frequency spectrum.

This transformed signal may then be processed at step 820 using one or more signal processing algorithms. In one embodiment, these signal processing algorithms may be frequency based, for example, one type of such an algorithm are a radiometer algorithms. In one particular embodiment, a channelized radiometer algorithm may be utilized such that energy in individual tones of the transformed signal may be processed. For example, in one embodiment PHY 510 may be substantially equivalent to a spectrum analyzer with a resolution of 4.125 MHz (e.g. a tone), which allow an environment to be surveyed to a power level of about −100 dBm assuming a noise figure of around 8 dB. Thus FFT/IFFT logic 620 may operate as a channelized radiometer capable of detecting signals in the environment.

Channelized radiometer algorithms may, however, lead to false alarms as the energy originating from any source in the operating environment may be detected by these types of algorithms as a potentially interfering signal. This may be problematic as momentary spikes in the energy, such as those produced by microwave ovens, may be detected and interpreted as a potentially interfering signal (e.g. that a certain frequency range within the frequency spectrum utilized by the cognitive radio is currently in use by another device).

Thus, in some embodiments other algorithms may be utilized to process the transformed signal. These algorithms may include time-frequency based processing techniques such as cyclostationary processing. Other time-frequency based processing techniques may also be utilized, such as those utilizing Wigner distribution, ambiguity surface or 2D-Fourier transforms, etc. It will be realized that almost any signal processing technique desired may be utilized in order to process or detect almost any desired characteristics of a signal.

The particular signal processing techniques used, and the particular implementation of the signal processing techniques, may depend on the accuracy, speed, etc. with which it is desired to detect or characterize such energy in the bands or tones. For example, the integration time used in conjunction with the transformed signal (e.g. from FFT/IFFT logic 620) may be adjusted based upon the parameters desired. These parameters (e.g. accuracy, speed etc.) may be specified by, for example, regulatory specifications or agencies.

It will also be noted that the processing of a transformed signal may occur at a variety of places in the architecture of cognitive radio 500 and that the signal processing algorithm(s) may be implemented in hardware, software or some combination of the two and that the particular implementation of signal processing utilized for a given embodiment of the present invention may be determined with respect to the signal processing algorithms utilized in conjunction with that embodiment of the invention. In one embodiment, for example, a transformed signal from FFT/IFFT logic 620 may be processed by hardware logic provided in PHY 510 of cognitive radio 500. For example, an application specific integrated circuit (ASIC) which comprises PHY 510 may comprise logic operable to perform desired signal processing on a transformed signal received from FFT/IFFT logic 620 and provide this processed signal through MAC/PHY interface 630.

Other embodiments of signal processing techniques may be accomplished at host 530. More specifically, in one embodiment, a transformed signal produced by the FFT/IFFT logic 620 may be provided to host 530. This may be done, for example by multiplexing the output of FFT/IFFT logic 620 such that the transformed signal is available to the host through the MAC/PHY interface 630 of radio 500. In other embodiments, an interface may be provided in an ASIC comprising FFT/IFFT logic 620 or the Inverse FFT (IFFT) such that the spectral data received or produced by the chipset may be made available to the host, for example through the MAC/PHY interface 630 to the host.

Thus, host 530 may process the received transformed signal (e.g. sample spectral data from FFT/IFFT logic 620) to detect energy present in the received signal which may indicate the presence of a potentially interfering signal according to one or more of the signal processing techniques discussed above.

In certain embodiments, however, it may be desired to process a transformed signal which corresponds to the entire frequency spectrum which cognitive radio 500 is operable to utilize, or a transformed signal corresponding to multiple distinct time periods (e.g. to detect signals which are not momentary spurs or emissions or which have periodicity). Thus, MAC 520 may provide a set of APIs to host 530 such that host 530 may obtain a transformed signal corresponding to a desired frequency spectrum or multiple time periods. To provide these transformed signals to host 530 MAC 510 may aggregate or otherwise composite transformed signals from FFT/IFFT logic 620, for example MAC 520 may average a certain number of transformed signals from different time periods to obtain a transformed signal to provide to host 530 or may composite transformed signals corresponding to two or more sub-bands to obtain a transformed signal corresponding to a frequency range or spectrum.

Based on the processing of transformed signal at step 820 any signals present in the operating environment may be identified and criteria corresponding to a potentially interfering signal determined at step 830. In one embodiment, a probabilistic algorithm may be applied during the processing of a signal or to a processed signal to determine whether any energy that exists in a particular frequency range (for example on a tone by tone basis) should be classified as energy from a potentially interfering signal, where the probabilistic function may be based on a desired level of confidence in detecting the presence of signal in a frequency range. The desired level of confidence, may in turn be dependent on a particular regulatory environment, such as that specified by one or more of the criteria (e.g. geography), as discussed above. Thus, the probabilistic function applied to determine potentially interfering signals in a transformed signal may also vary based upon one or more of the criteria discussed above.

The portions of the transformed signal where it is determined potentially interfering signal energy exists may then be analyzed to determine criteria corresponding to these potentially interfering signals where these criteria may comprise a set of characteristics. These characteristics include the frequency range encompassed by a detected potentially interfering signal, the power level of a detected potentially interfering signal, if the detected potentially interfering signal comprises repeating beacons and if there are repeating beacons the spacing or timing of the beacons (e.g. the interval between, and length of, the beacons), etc.

Returning now to FIG. 7, these interfering signal characteristic along with other criteria may then be used, at step 720 to determine an action (if any) to be implemented with respect to transmissions from cognitive radio 500. More specifically, in one embodiment, criteria may be used to determine one or more rules satisfied by the criteria and actions associated with the satisfied rules implemented.

In one embodiment, host 530 may implement policy logic for determining the action to be implemented, where this policy logic comprises a set of rules and corresponding actions associated with each of the of rule. Each of these rules, in turn, may define a set of values for a particular set of criteria. In this manner, rules corresponding to particular regulatory environments or potentially interfering signals may be defined. For example, a regulatory environment may be defined by a rule with a particular value defined for a criterion of geographical location, a particular type of potentially interfering signal may defined using certain values for criteria comprising frequency range, power, existence of beacons, timing or spacing of beacons within a detected signal, etc. (e.g. a WiMax signal may be defined by a rule having a value corresponding to frequency range 410 defined for a criterion corresponding to frequency range). In other words, these rules may be thought of definitions of regulatory policies or types of potentially interfering signals. It will be apparent that rules may be used to specify values corresponding to almost any type of device, signal, protocol, regulatory environment, configuration of associated devices or almost any other type of environment where it is desired to implement one or more actions.

Associated with these rules may be one or more actions to implement if that rule is satisfied (e.g. if values of the criteria corresponding to a potentially interfering signal are substantially the same, or within a range of, the corresponding values specified by the rule). Thus, by comparing criteria associated with a potentially interfering signal or other criteria (e.g. geographic locale, etc.) to the set of rules, a set of rules satisfied by the criteria corresponding to potentially interfering signals or other criteria may be determined and the set of actions corresponding to each of these satisfied rules likewise determined.

The determined actions (e.g. associated with the satisfied rules) may then be applied at step 730. More specifically, the actions determined at step 730 may comprise one or more actions for non-collaborative coexistence with other potential users of the frequency spectrum utilized by the cognitive radio. These actions may comprise the modification of one or more transmission properties of cognitive radio.

In one embodiment, the frequency, power or timing of transmissions from a cognitive radio may be altered based on the actions. For example, the timing of the transmissions of a cognitive radio may be modified such that transmissions from the cognitive radio may occur at times when a detected potentially interfering signal is not present in the operating environment. In fact, transmissions of a cognitive radio may be synchronized with the timing of detected potentially interfering signal such that substantially no overlap occurs. This synchronization may encompass active frequency hopping such that a cognitive radio is transmitting on a different frequency than a detected potentially interfering signal during a time period, time hopping so that a cognitive radio it transmitting at a different time period than the detected potentially interfering signal, or both. In one particular, embodiment the transmission properties of the cognitive radio may be altered to achieve frequency based waterfilling of the frequency spectrum utilized by the cognitive radio while in another embodiment time-frequency waterfilling may be achieved by altering the transmission properties of the cognitive radio.

The transmission properties of a cognitive radio may also be modified such that the emissions (e.g. power levels) in a certain frequency are substantially suppressed to shape the spectrum of signals transmitted by a cognitive radio to substantially avoid or reduce transmissions in these frequency ranges. In one particular embodiment, to shape the power spectrum of transmissions of the cognitive radio a weighting function is applied to one or more of the tones (e.g. data in tones) or spectral bands for transmission such that notches are created in the power spectrum of the ensuing transmission. This weighting may be implemented in certain embodiments by utilizing a set of registers in FFT/IFFT logic 620 in the cognitive radio, such that a weight vector can be stored in the registers by host 530 (for example a value between one and zero) and this weight vector applied to one or more tones (e.g. before an IFFT is performed). In one specific embodiment, a weight vector may be applied to one or more tones such that the power spectrum of the ensuing transmission may be shaped such that notches are created at the desired points in the frequency spectrum (i.e. power of the signal is reduced at these points in the frequency spectrum). These desired points may substantially coincide with frequency range of a detected potentially interfering signal determined by the cognitive radio such that the transmission signal may be attenuated in that frequency range.

In one embodiment, the spectrum of signals transmitted by cognitive radio 500 may be shaped using a bandstop filter or one or more of the techniques, for example windowing or tone mapping, disclosed in U.S. patent application Ser. No. 11/652,934 by inventors Johann Chiang and Kevin Shelby entitled "Method and System for Sidelobe Reduction Using Antipodal Signaling," filed on Jan. 12, 2007 or U.S. patent application Ser. No. 11/652,935 by inventors Johann Chiang, Kevin Shelby and Jim Lansford entitled "Method and System for Windowing," filed on Jan. 12, 2007, both of which are incorporated fully herein by reference for all purposes.

Figure 9:
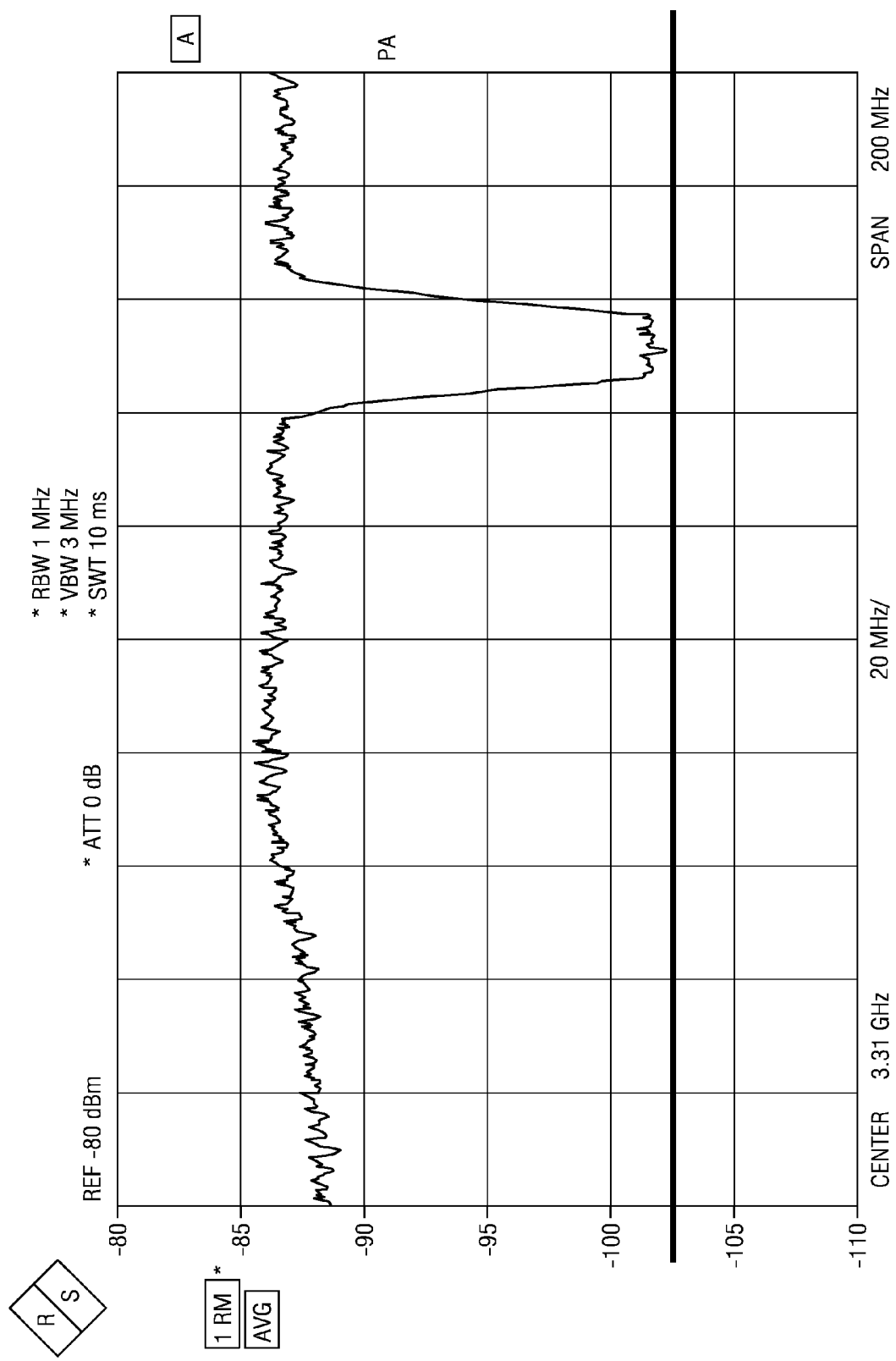
FIG. 9 is a depiction of a signal transmitted according to a particular set of transmission properties.

FIG. 9 depicts one embodiment of a shaped power spectrums according to various embodiments of the present invention. Notice that in some cases notches created in power spectrums may be greater than 20 db deep, and may cover an arbitrary segment of the frequency spectrum. Here, a shaped OFDM signal is presented whereby if signals from a cognitive radio are transmitted according to such a shaped signal, a cognitive radio may coexist with an incumbent fixed wireless access (FWA) signal.

While the non-collaborative actions described above may be useful in suppressing or altering transmission of a cognitive radio to achieve coexistence with other device or conform to regulatory environments these non-collaborative actions may result in an undesired degradation in the performance of a cognitive radio. Thus, to reduce the degradation in performance which may come result from coexistence with other types of devices or conforming to certain regulatory environments, in one embodiment of the present invention the actions determined at step 730 may comprise one or more actions for collaborative coexistence.

In one embodiment, a rule satisfied by criteria corresponding to a potentially interfering signal, a cognitive radio may correspond to a type of device with which it is possible to coordinate the use of frequency ranges or time periods, which may comprise a determination of frequencies or time periods to be utilized by cognitive radio and emitter of the potentially interfering signals such that performance (e.g. throughput, latency, error rate, or any other measurement desired) of devices sharing the frequency spectrum may be optimized. Thus, one or more actions may comprise actions corresponding to the establishment of this collaborative optimization through the exchange of information between the cognitive radio and other devices.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. For example, though embodiments of the present invention have been described in conjunction with the design and implementation of interference detection and OFDM signal shaping among others, it will be apparent to those of skill in the art that embodiments of the present invention may be utilized to design and implement almost any type of radio device desired.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for a cognitive radio, comprising:
    determining one or more criteria associated with an operating environment of an ultrawideband (UWB) transceiver, wherein the determination of the one or more criteria comprises processing a transformed signal at a host, the host received the transformed signal from a Media Access Control (MAC) layer, the MAC layer produced the transformed signal by compositing a plurality of signals received from Fast Fourier Transform (FFT) or Inverse Fast Fourier Transform (IFFT) Logic and the plurality of signals were received at a plurality of time periods;
    determining a set of actions based on the one or more criteria, where the set of actions comprise a set of transmission properties including a frequency range; and
    transmitting a signal from the UWB transceiver, wherein the signal adheres to the transmission properties so that when the signal is transmitted using a frequency spectrum comprising the frequency range the signal has a first power level within a first portion of the frequency spectrum substantially comprising the frequency range and the signal has a second power level in a second portion of the frequency spectrum associated with a potentially interfering signal that is substantially outside the frequency range, wherein the signal is shaped by applying a weight vector to one or more tones so that the first power level is higher than the second power level.

2. The method of claim 1, wherein determining the criteria comprises detecting the potentially interfering signal and determining a set of characteristics corresponding to the potentially interfering signal, wherein detecting a potentially interfering signal is done based on energy present in each of a plurality of tones associated with a signal.

3. The method of claim 1, wherein the received signal is processed using a frequency based technique.

4. The method of claim 3, wherein the received signal is processed using a channelized radiometer.

5. The method of claim 4, wherein the channelized radiometer is implemented using the Fast Fourier Transform (FFT) or Inverse Fast Fourier Transform (IFFT) logic.

6. The method of claim 1, wherein the received signal is processed using a time-frequency based technique.

7. The method of claim 6, wherein the received signal is processed using cyclostationary processing.

8. The method of claim 7, wherein the received signal is processed using a 2-D FFT, Wigner distribution or ambiguity surfacing.

9. The method of claim 1, wherein the transmission properties comprise a suppression of emissions in a frequency range.

10. The method of claim 9, wherein the transmission properties comprise a suppression of emissions during a time period.

11. The method of claim 10, further comprising applying a windowing function or tone mapping to the transmitted signal.

12. The method of claim 1, wherein the criteria comprises a criterion corresponding to a regulatory environment.

13. The method of claim 12, wherein the criterion is a location.

14. A cognitive radio; comprising:
   an ultrawideband (UWB) transceiver operable to:
      determine one or more criteria associated with an operating environment of the ultrawideband (UWB) transceiver, wherein the determination of the one or more criteria comprises processing a transformed signal at a host, the host received the transformed signal from a Media Access Control (MAC) layer, the MAC layer produced the transformed signal by compositing a plurality of signals received from Fast Fourier Transform (FFT) or Inverse Fast Fourier Transform IFFT Logic and the plurality of signals were received at a plurality of time periods;
      determine a set of actions based on the one or more criteria, where the set of actions comprise a set of transmission properties including a frequency range; and
      transmit a signal, wherein the signal adheres to the transmission properties so that when the signal is transmitted using a frequency spectrum comprising the frequency range the signal has a first power level within a first portion of the frequency spectrum substantially comprising the frequency range and the signal has a second power level in a second portion of the frequency spectrum associated with a potentially interfering signal substantially outside the frequency range, wherein the signal is shaped by applying a weight vector to one or more tones so that the first power level is higher than the second power level.

15. The cognitive radio of claim 14, wherein determining the criteria comprises detecting the potentially interfering signal and determining a set of characteristics corresponding to the potentially interfering signal, wherein detecting a potentially interfering signal is done based on energy present in each of a plurality of tones associated with a signal.

16. The cognitive radio of claim 14, wherein the received signal is processed using a frequency based technique.

17. The cognitive radio of claim 16, wherein the received signal is processed using a channelized radiometer.

18. The cognitive radio of claim 17, wherein the channelized radiometer is implemented using the Fast Fourier Transform (FFT) or Inverse Fast Fourier Transform (IFFT) logic.

19. The cognitive radio of claim 14, wherein the received signal is processed using a time-frequency based technique.

20. The cognitive radio of claim 19, wherein the received signal is processed using cyclostationary processing.

21. The cognitive radio of claim 20, wherein the received signal is processed using a 2-D FFT, Wigner distribution or ambiguity surfacing.

22. The cognitive radio of claim 14, wherein the transmission properties comprise a suppression of emissions in a frequency range.

23. The cognitive radio of claim 22, wherein the transmission properties comprise a suppression of emissions during a time period.

24. The cognitive radio of claim 23, wherein the UWB transceiver is further operable to apply a windowing function or tone mapping to the transmitted signal.

25. The cognitive radio of claim 14, wherein the criteria comprises a criterion corresponding to a regulatory environment.

26. The cognitive radio of claim 25, wherein the criterion is a location.

* * * * *